US008933883B2

(12) United States Patent
Wu

(10) Patent No.: US 8,933,883 B2
(45) Date of Patent: Jan. 13, 2015

(54) LIGHT-POINTING DEVICE AND LIGHT-TRACKING RECEIVER HAVING A FUNCTION SELECTION KEY AND SYSTEM USING THE SAME

(75) Inventor: Meng-Tsung Wu, Hsin-Chu (TW)

(73) Assignee: Pixart Imaging, Inc., Hsin-Chu (TW)

( * ) Notice: Subject to any disclaimer, the term of this patent is extended or adjusted under 35 U.S.C. 154(b) by 1341 days.

(21) Appl. No.: 11/554,404

(22) Filed: Oct. 30, 2006

(65) Prior Publication Data

US 2007/0188447 A1 Aug. 16, 2007

(30) Foreign Application Priority Data

Feb. 15, 2006 (TW) .............................. 95105012 A

(51) Int. Cl.
G06F 3/033 (2013.01)
G06F 3/03 (2006.01)
G06F 3/0346 (2013.01)

(52) U.S. Cl.
CPC ............ *G06F 3/0304* (2013.01); *G06F 3/0346* (2013.01)
USPC ........... 345/158; 345/179; 345/163; 345/166; 345/180; 382/165; 382/127; 235/462.43

(58) Field of Classification Search
USPC ......... 345/156, 180, 182, 157–158, 179, 166; 345/163; 382/165, 127; 235/462.43
See application file for complete search history.

(56) References Cited

U.S. PATENT DOCUMENTS

| 5,742,278 | A | * | 4/1998 | Chen et al. ..................... 345/156 |
| 5,933,132 | A | * | 8/1999 | Marshall et al. .............. 345/158 |
| 6,704,000 | B2 | * | 3/2004 | Carpenter ...................... 345/158 |
| 6,906,699 | B1 | * | 6/2005 | Fåhraeus et al. .............. 345/157 |
| 2002/0042699 | A1 | * | 4/2002 | Tanaka et al. ..................... 703/2 |
| 2002/0140670 | A1 | * | 10/2002 | Albeck et al. .................. 345/156 |
| 2003/0021492 | A1 | * | 1/2003 | Matsuoka et al. ............. 382/295 |
| 2003/0063260 | A1 | * | 4/2003 | Nishimura et al. ............... 353/1 |
| 2003/0090566 | A1 | * | 5/2003 | Smith et al. .................... 348/131 |
| 2004/0189621 | A1 | * | 9/2004 | Cho et al. ....................... 345/179 |
| 2004/0207597 | A1 | * | 10/2004 | Marks ............................ 345/156 |

FOREIGN PATENT DOCUMENTS

| JP | 2001290600 A | 10/2001 |
| JP | 2004164142 A1 | 6/2004 |
| JP | 2005513834 A | 5/2005 |
| WO | 2005073838 A2 | 8/2005 |

OTHER PUBLICATIONS

Aug. 28, 2012 Office Action issued by Japanese Patent Office against Japanese counterpart application.
English Translation of Aug. 28, 2012 Office Action issued by Japanese Patent Office against Japanese counterpart application.

* cited by examiner

*Primary Examiner* — Shaheda Abdin
(74) *Attorney, Agent, or Firm* — Egbert Law Offices, PLLC

(57) ABSTRACT

A light-pointing device generates a light beam, and converts the light beam into a flicker mode with the function selection keys. Different function selection keys trigger different flicker frequencies. The dotted image of the light beam is formed in a plurality of frames detected by the tracking receiver. The tracking receiver determines the start of a specific function according to the frequency of occurrence or the interval mode of the dotted image in the plurality of successive frames.

10 Claims, 4 Drawing Sheets

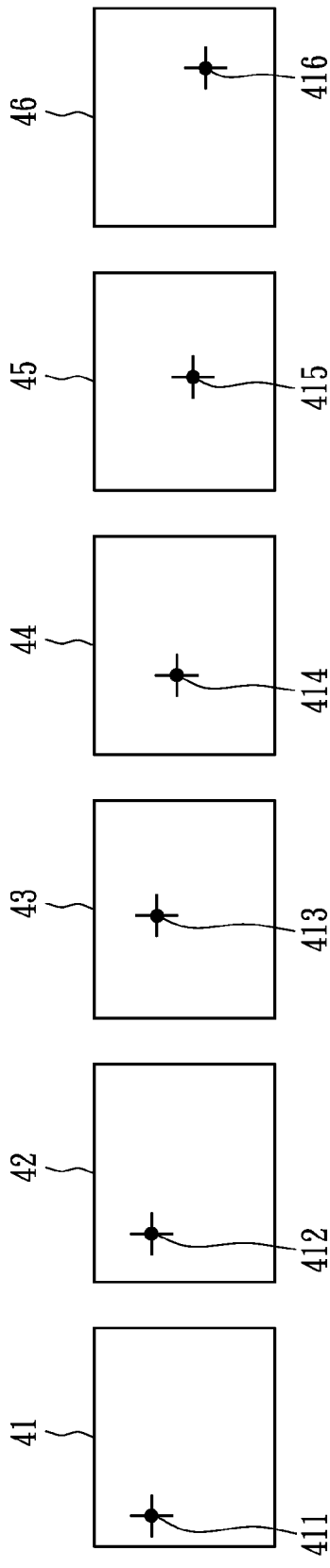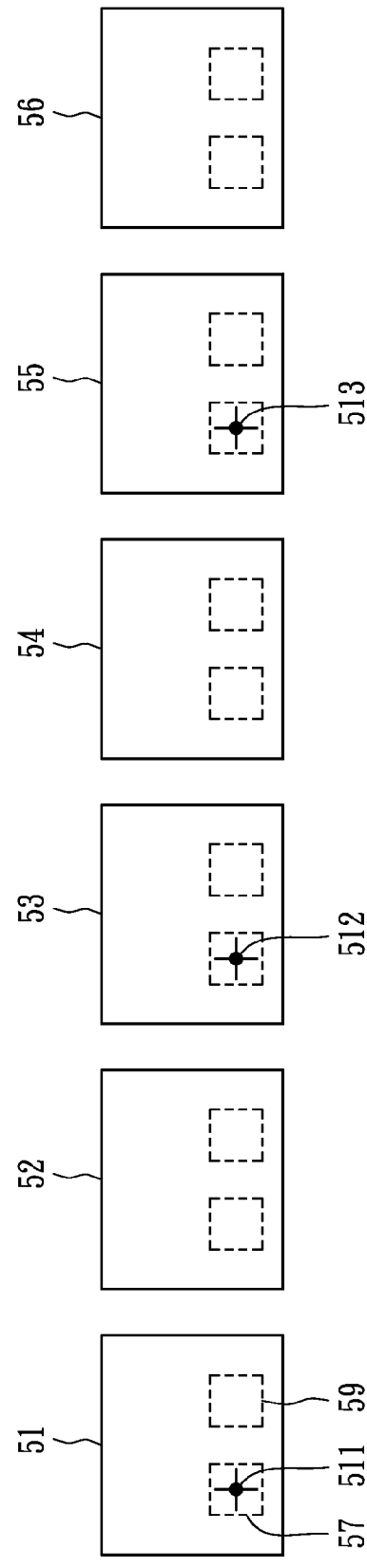

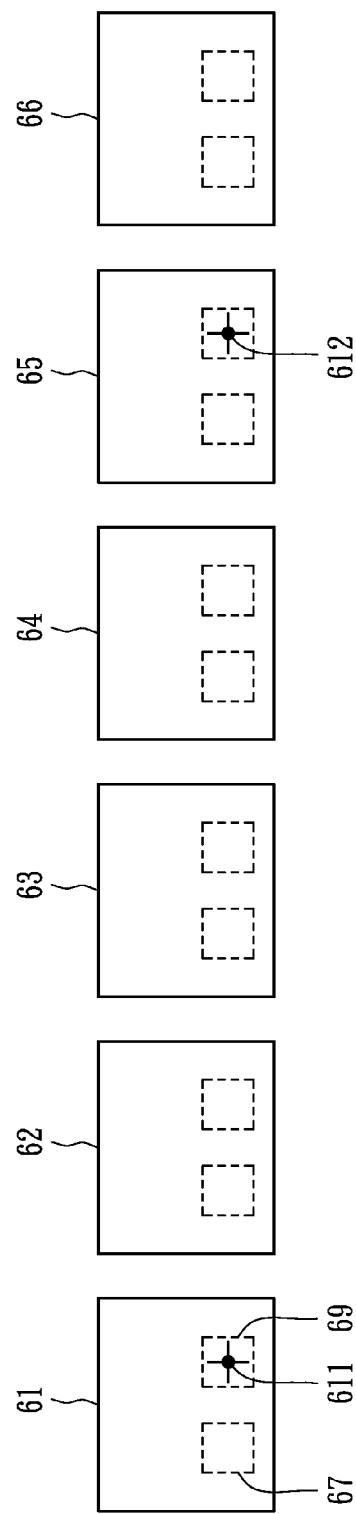
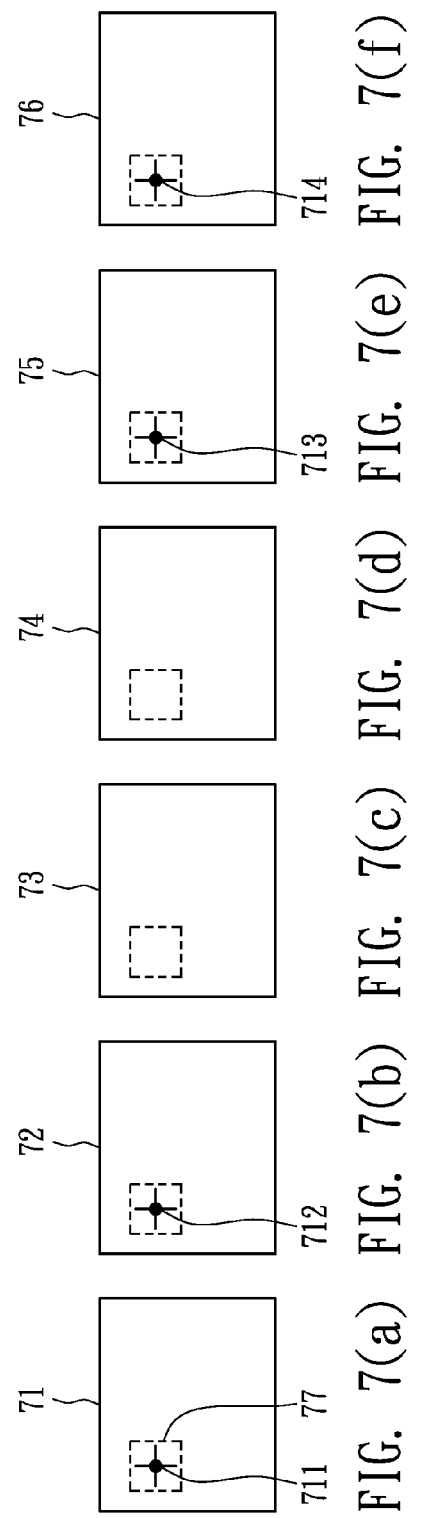

LIGHT-POINTING DEVICE AND LIGHT-TRACKING RECEIVER HAVING A FUNCTION SELECTION KEY AND SYSTEM USING THE SAME

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a light-pointing device and a light-tracking receiver having function selection keys and a system using the same, and more particularly, to a system that controls a cursor and selects the desired function with non-contact light spots.

2. Description of Related Art Including Information Disclosed Under 37 CFR 1.97 and 37 CFR 1.98.

Currently, a pointing device (e.g., a roller ball mouse, an optical mouse, and the like) tracks the position of a target (or a cursor) based on sensing a relative movement between its input interface and a contact surface. When a common roller ball mouse moves on a surface, the roller ball inside the mouse can rotate and drive a set of optical encoders, which compute the number of steps of the movement along the X direction and the Y direction simultaneously. According to the information on the number of the steps, a computer can determine a movement vector of the cursor relative to its coordinates of a previous location during each frame period. Additionally, the optical mouse uses an image sensor to capture the surface's images that consecutively change, and compares the images to calculate the movement of the current cursor relative to its previous location.

In addition, another non-contact pointing device is designed to control a TV game or to turn the pages of an e-book shown on a TV screen. Such a pointing device emits an infrared light beam to control the movement of a target or a cursor on a frame. Actually, a light receiver having a motion-tracking sensor is disposed at a place adjacent to the screen where the frame is displayed. When a user moves the pointing device, the motion-tracking sensor capturing the images of a plurality of frames per second can receive a continuous dotted pattern of the movement of the infrared light beam. Therefore, the light receiver can compare different coordinates of the dotted pattern occurring in each frame, and it instantly modifies the current location of the target or the cursor on the screen.

However, the pointing device can only control the displayed location of a target or a cursor, but cannot satisfy the requirements for function selections (e.g., clicking a functional icon or a page-turning button on the screen) of a TV game or an e-book. Consequently, in the current TV game market, a light-pointing and receiving system capable of both controlling the location of the cursor and enabling interactive function selections is urgently needed to improve the real-time and interactive entertainment effect of TV game apparatuses and e-books.

BRIEF SUMMARY OF THE INVENTION

An objective of the present invention is to provide a light-pointing device and a light-tracking receiver having function selection keys and a system using the same. The actions in response to various selection keys on the light-pointing device are distinguished by flicker frequencies of a light beam, and the light-tracking receiver determines the start of a specific function according to the flicker frequency of a received light spot.

To achieve the aforesaid objective, the present invention discloses a light-pointing device and a light-tracking receiver having function selection keys and a system using the same. The light-pointing device generates a light beam, and switches the light beam into a light flicker mode through the function selection keys. Different function selection keys trigger the light beam to flicker in different frequencies. A dotted image of the light beam is formed in a plurality of frames detected by the tracking receiver. The tracking receiver determines the start of a specific function according to the frequency at which it occurs or the interval mode of the dotted image in the plurality of successive frames.

The frame defines several areas, each enclosed by corresponding coordinates, to show various functional blocks. When the dotted pattern of the light beam appears in an area enclosed by corresponding coordinates and representing a certain functional block, and the function selection key corresponding to the functional block is triggered, the function defined by the functional block is started.

BRIEF DESCRIPTION OF THE SEVERAL VIEWS OF THE DRAWINGS

The invention will be described according to the appended drawings.

FIGS. 4(a)-4(f) are schematic views of the first embodiment of capturing the successive frames through the tracking receiver of the present invention.

FIGS. 5(a)-5(f) are schematic views of the second embodiment of capturing the successive frames through the tracking receiver of the present invention.

FIGS. 6(a)-6(f) are schematic views of the third embodiment of capturing the successive frames through the tracking receiver of the present invention.

FIGS. 7(a)-7(f) are schematic views of the fourth embodiment of capturing the successive frames through the tracking receiver of the present invention.

DETAILED DESCRIPTION OF THE INVENTION

Figure 1:
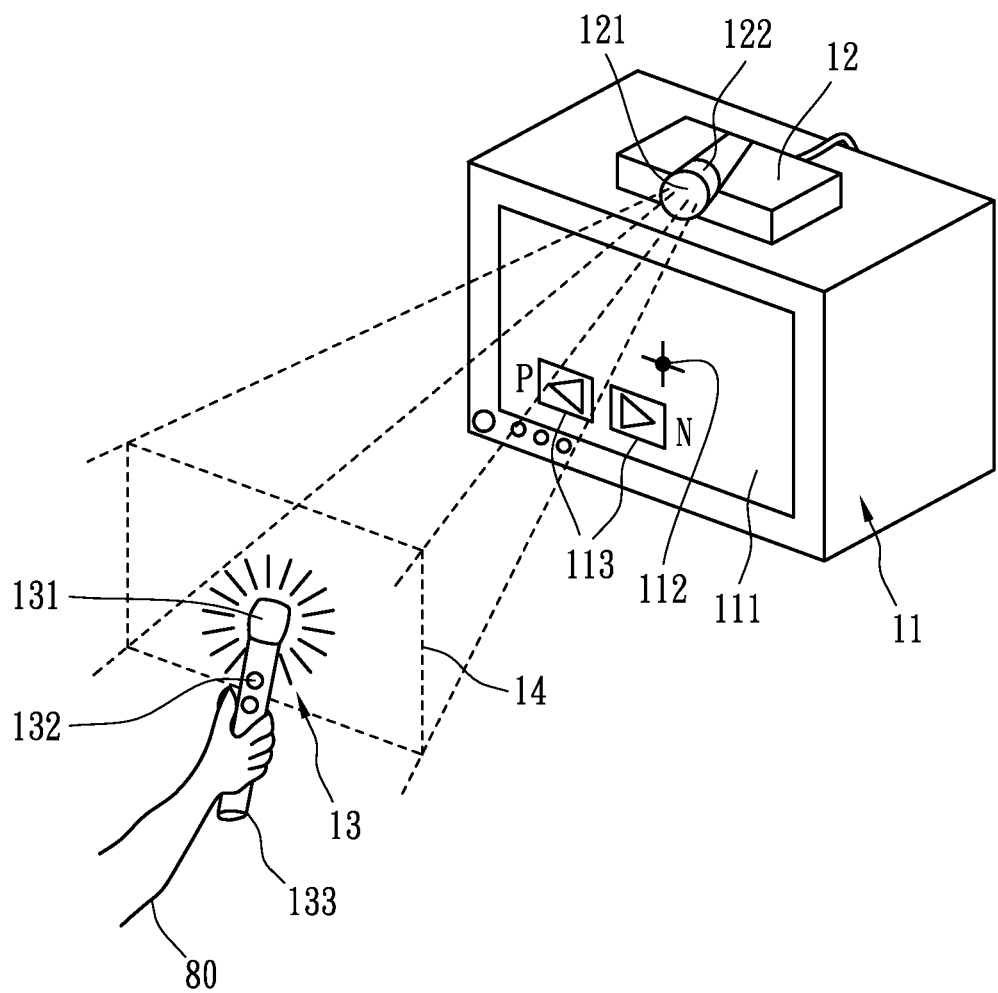
FIG. 1 is a schematic view of an application of the light-pointing and receiving system in accordance with the present invention.

FIG. 1 is a schematic view of an application of the light-pointing and receiving system of the present invention. A user 80 can move a light-pointing device 13 to control the movement of a cursor 112 or a target in a TV frame 111 displayed on the screen of a TV 11. The light-pointing device 13 has a light-emitting portion 131 disposed at the front end thereof, wherein the light-emitting portion 131 capable of generating light beams usually emits infrared rays to prevent the interference of visible lights in the environment. Function selection keys 132 are disposed on a holding portion 133 of the light-pointing device 13. When the function selection keys 132 are pressed down, the light beam generated from the light-emitting portion 131 is switched into a light flicker mode, in which the light beam becomes bright and dark alternately. Different function selection keys 132 can be configured to correspondingly different flicker frequencies.

The infrared rays emitted from the light-emitting portion 131 pass through a filter 121 and a wide-angle lens 122, and then enter photoelectric elements inside a tracking receiver 12. A dotted image of the infrared rays is formed in various detected frames, and the tracking receiver 12 instantly converts the detected dotted image into a cursor 112 in the TV frame 111 by connecting dots into lines. Functions, such as turning to the next page or turning back to the previous page, defined by each of functional blocks 113 can be started and executed when the cursor 112 is moved into each functional block 113, and a corresponding function selection key 132 is pressed. Moreover, an effective detecting range and an effective detecting area 14 corresponding to a frame coordinate are defined in the front of the wide-angle lens 122. If the user 80 moves the light beam outside the effective detecting area 14, the movement of the cursor 112 cannot be controlled.

Figure 2:
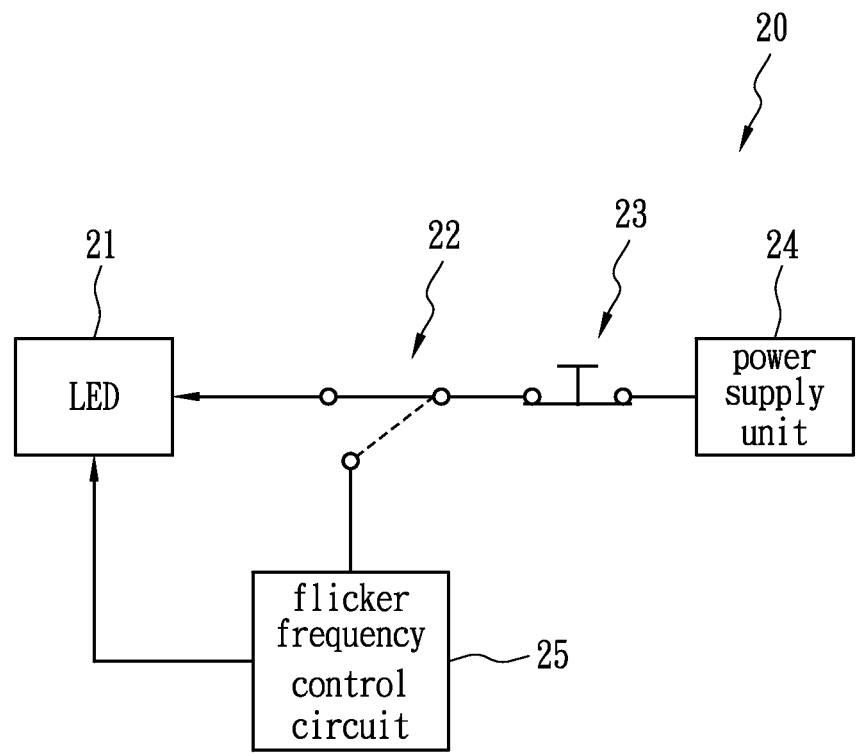
FIG. 2 is a schematic view of the light-generating circuit of the light-pointing device in accordance with the present invention.

FIG. 2 is a schematic view of a light-generating circuit of the light-pointing device 13 of the present invention. The light-generating circuit 20 of the light-pointing device 13 comprises a power supply unit 24, a power switch 23, a changeover switch 22, a flicker frequency control circuit 25, and a light-emitting diode (LED) 21. The power switch 23 directly controls the power supply unit 24 to supply power to the LED 21. When one function selection key 132 on the light-pointing device 13 is pressed down, the changeover switch 22 will be switched to the flicker frequency control circuit 25. Therefore, the LED 21 receives a pulse current output from the flicker frequency control circuit 25, and generates a flicker light beam with a constant frequency.

Figure 3:
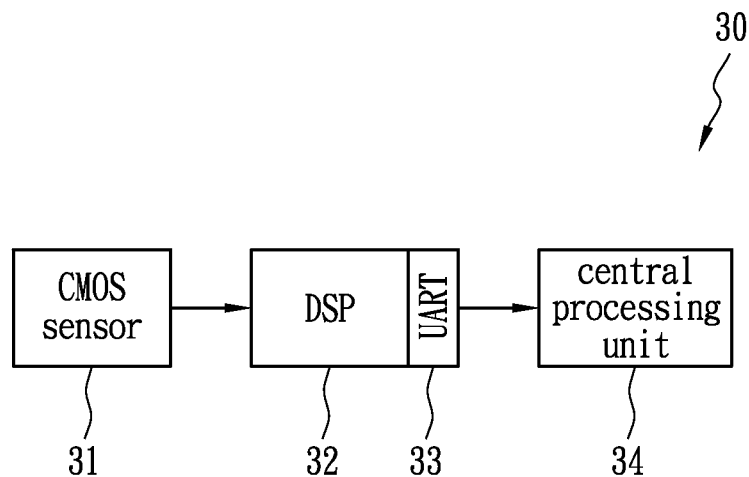
FIG. 3 is a schematic view of the light-tracking and receiving circuit of the tracking receiver in accordance with the present invention.

FIG. 3 is a schematic view of a light-tracking and receiving circuit 30 of the tracking receiver 12 of the present invention. The light-tracking and receiving circuit 30 comprises a complementary metal-oxide semiconductor (CMOS) sensor 31, a digital signal processor (DSP) 32, a universal asynchronous receiver transmitter (UART) interface 33, and a central processing unit (CPU) 34. The CMOS sensor 31 converts optical signals of successive imaging into digital signals of a plurality of frames. Next, the DSP 32 performs data compression and data filter on the digital signals, so as to obtain the digital signals of quantity, size, shape, and coordinate parameters of detected objects in each frame. Then, the UART interface 33 converts the obtained digital signals into serial signals, such that the CPU 34 can determine the position and movement vector of a light spot. As the amount of data becomes smaller after being compressed and filtered, the light-tracking and receiving circuit 30 can capture and process 200 frames per second (200 FPS). The CPU 34 then determines which function is to be started according to the position and frequency (or interval mode) of the light spot in successive frames.

FIGS. 4(a)-4(f) are schematic views of successive frames captured by the tracking receiver 12 of the present invention. Referring to FIG. 2 again, when the light-generating circuit 20 is not switched to the flicker frequency control circuit 25, dotted patterns 411-416 of the light spot are detected in the frames 41-46. However, when the light-generating circuit 20 is switched to the flicker frequency control circuit 25, the LED 21 will generate flicker light beams according to the frequencies required by different function selection keys 132. For example, when the upper function selection key 132 is pressed, the light will flicker 100 times per second. Therefore, the tracking receiver 12 capable of processing 200 frames per second receives successive frames 51-56 as shown in FIGS. 5(a)-5(f). The frames 51-56 have two functional blocks 57 and 59, which occupy different coordinate ranges, respectively. When dotted patterns 511-513 of the light spot appear in the functional block 57 intermittently, and have the flicker frequency of 100 times per second that is acceptable to the functional block 57, the function defined by the functional block 57 is started. The dotted patterns 511-513 in FIGS. 5(a)-5(f) appear every two frames, so the CPU 34 can calculate that the flicker frequency is 100 times per second.

Similarly, as shown in FIGS. 6(a)-6(f), if the functional block 69 cannot start its function unless it receives a light spot flickering 70 times per second, one of dotted patterns 611-612 is detected in every four frames among the frames 61-66. Moreover, the functional block 67 is configured to have a coordinate range that is only triggered by a light spot flickering 100 times per second. That is, the CPU 34 will not perform the function defined by the functional block 69 unless the dotted pattern 612 appears in every four frames.

In addition to the light flicker mode described above, FIGS. 7(a)-7(f) show another interval mode of the light spot accepted by the tracking receiver 12 of the present invention. In these figures, dotted patterns 711-714 in successive frames 71-76 appear in the functional block 77 of each of two neighboring frames 71-72, and then disappear from the functional block 77 of two subsequent frames 73-74, and will continue to appear and disappear according to the mode described above. It is apparent that the light flicker mode of the light-pointing device 13 of the present invention is not limited to the interval manners described in the embodiments, and similarly, the tracking receiver 12 can receive dotted patterns of various flicker modes based on the definition.

The above-described embodiments of the present invention are intended to be illustrative only. Numerous alternative embodiments may be devised by persons skilled in the art without departing from the scope of the following claims.

I claim:

1. A light-tracking receiver for tracking and receiving a flickering light beam from a light-pointing device, the light-tracking receiver comprising:
an image sensor for receiving the flickering light beam and generating a plurality of digital signals forming a plurality of successive two-dimensional frames;
a digital signal processor for processing said plurality of digital signals and outputting output signals; and
a central processing unit for determining light spot patterns of the flickering light beam according to a position and frequencies of the light spot pattern of the of the flickering light beam in a plurality of successive two-dimensional frames by analyzing an appearance and disappearance frequency of the light spot patterns in said plurality of successive two-dimensional frames wherein the frequency of the light spot patterns of the flickering light beam is determined according to a capture rate of the plurality of successive two-dimensional frames.

2. The light-tracking receiver of claim 1, further comprising:

a universal asynchronous receiver transmitter interface disposed between said digital signal processor and said central processing unit.

3. The light-tracking receiver of claim 1, wherein said central processing unit setting the light beam into a non-flickering mode when the specified pattern appears continuously in said plurality of successive two-dimensional frames.

4. The light-tracking receiver of claim 1, wherein the light spot pattern is a dotted pattern.

5. The light-tracking receiver of claim 1, wherein the image sensor is a complementary metal oxide semiconductor sensor.

6. The light-tracking receiver of claim 1, wherein the digital signal that has been processed by said digital signal processor is a coordinate digital signal.

7. A light-pointing tracking and receiving system comprising:
    a display comprising a screen displaying a cursor;
    a light-pointing device configured for remotely controlling a movement of said cursor, said light-pointing device having a plurality of function selection keys for respectively generating flickering light beams at different flickering frequencies; and
    a light-tracking receiver for receiving one of the flickering light beams and for continuously generating a plurality of successive two-dimensional frames, according to the determining light spot pattern of the flickering light beam according to a position and frequency of the light spot pattern of the flickering light beam by a plurality of successive two-dimensional frames by analyzing an appearance and disappearance frequency of the light spot pattern in said plurality of successive two-dimensional frames, wherein at least one of the plurality of successive two-dimensional frames does not include the light spot pattern, wherein the frequency of the light spot pattern of the flickering light beam is determined according to a capture rate of the plurality of successive two-dimensional frames.

8. The light-pointing tracking and receiving system of claim 7, wherein a predetermined function is performed when the position of the image of the flickering light beam is within a predetermined coordinate range, and when the frequency of the imaging of the flickering light beam is consistent with the frequency defined for the predetermined function.

9. The light-pointing tracking and receiving system of claim 7, wherein said light-tracking receiver determines the appearance and disappearance frequency of the light spot pattern according to a capturing speed of said plurality of successive two-dimensional frames and a number of intervals of the light spot patterns.

10. A light-tracking receiver for tracking and receiving a flickering light beam from a light-pointing device, the light-tracking receiver comprising:
    an image sensor for receiving the flickering light beam and generating a plurality of digital signals forming a plurality of successive two-dimensional frames, wherein at least one of said plurality of successive frames;
    a digital signal processor for processing said digital signals and outputting output signals; and
    a central processing unit for determining light spot patterns of the flickering light beam according to a position and frequency of the light spot pattern of the flickering light beam in a plurality of successive two-dimensional frames by analyzing an appearance and disappearance frequency of the light spot patterns in said plurality of successive two-dimensional frames when the light spot patterns are located within a predetermined coordinate range of said corresponding frames wherein the frequency of the light spot pattern of the flickering light beam is determined according to a capture rate of the plurality of successive two-dimensioned frames.

\* \* \* \* \*